(12) United States Patent
Podolefsky (10) Patent No.: US 9,484,602 B1
(45) Date of Patent: Nov. 1, 2016

(54) LIGHT TOWER HAVING A BATTERY HOUSING

(71) Applicant: OSC Manufacturing & Equipment Services, Inc., Buffalo, NY (US)

(72) Inventor: Noah Solomon Podolefsky, Boulder, CO (US)

(73) Assignee: OSC Manufacturing & Equipment Services, Inc., Buffalo, NY (US)

( * ) Notice: Subject to any disclaimer, the term of this patent is extended or adjusted under 35 U.S.C. 154(b) by 159 days.

(21) Appl. No.: 14/465,681

(22) Filed: Aug. 21, 2014

Related U.S. Application Data (60) Provisional application No. 61/868,608, filed on Aug. 22, 2013.

(51) Int. Cl.
| | |
|---|---|
| B60Q 3/04 | (2006.01) |
| F21V 15/00 | (2015.01) |
| F21S 8/00 | (2006.01) |
| F21S 13/10 | (2006.01) |
| H01M 10/42 | (2006.01) |
| F21L 4/02 | (2006.01) |
| H02P 25/02 | (2016.01) |
| F21W 131/10 | (2006.01) |

(52) U.S. Cl.
CPC ............ H01M 10/4257 (2013.01); F21L 4/02 (2013.01); H02P 25/02 (2013.01); F21W 2131/10 (2013.01); H01M 2220/20 (2013.01); H01M 2220/30 (2013.01)

(58) Field of Classification Search
CPC .................... H01M 10/4257; H01M 2220/20; H01M 2220/30; F21L 4/02; H02P 25/02; F21W 2131/10

USPC ........ 362/184, 190, 191, 194, 431; 429/163, 429/176; 180/68.5
See application file for complete search history.

(56) References Cited

U.S. PATENT DOCUMENTS

| | | |
|---|---|---|
| 5,913,811 A | 6/1999 | Kinugawa et al. |
| 5,991,677 A | 11/1999 | Kinugawa et al. |
| 6,078,855 A | 6/2000 | Kinugawa et al. |
| 6,199,307 B1 | 3/2001 | Kagoshima et al. |
| 6,491,123 B1 | 12/2002 | Pasquini et al. |
| 6,615,946 B2 | 9/2003 | Pasquini et al. |
| 6,666,022 B1 | 12/2003 | Yoshimatsu et al. |
| 6,725,581 B2 | 4/2004 | Naruse et al. |
| 6,789,335 B1 | 9/2004 | Kinugawa et al. |

(Continued)

*Primary Examiner* — Elmito Breval
*Assistant Examiner* — Glenn Zimmerman
(74) *Attorney, Agent, or Firm* — Del Vecchio and Stadler LLP (57) ABSTRACT

Conventional internal combustion engine technology has been around for decades and historically has been the primary power source for virtually all industrial equipment. It relies on carbon-based fuels, is loud, polluting, and the machines it powers are expensive to operate and maintain. A self-contained, rechargeable battery system is provided that possesses superior power than comparable diesel and gas engines. The rechargeable battery power system generates zero emissions, is virtually maintenance free, is quiet, and recharges overnight via a standard electrical outlet. The rechargeable battery power system can be installed in new and used construction equipment (light towers, excavators, generators) and may be used wherever a source of power is required, for example, in vans and boats, and in supplemental power systems including smart grid applications. It can be safely used indoors, in neighborhoods and other locations sensitive to the side effects of internal combustion engines.

11 Claims, 10 Drawing Sheets

(56) References Cited

U.S. PATENT DOCUMENTS

| | | |
|---|---|---|
| 6,820,356 B2 | 11/2004 | Naruse et al. |
| 6,945,039 B2 | 9/2005 | Yoshino |
| 6,959,241 B2 | 10/2005 | Itow et al. |
| 7,511,449 B2 | 3/2009 | Speckhart et al. |
| 7,911,079 B2 | 3/2011 | Hoff |
| 7,950,481 B2 | 5/2011 | Betz et al. |
| 8,100,210 B2 | 1/2012 | Takeuchi et al. |
| 8,125,105 B2 | 2/2012 | Ishida et al. |
| 8,286,741 B2 | 10/2012 | Kawashima |
| 2005/0237021 A1 | 10/2005 | Sugano et al. |
| 2009/0261761 A1 | 10/2009 | Yoshioka |
| 2010/0141438 A1* | 6/2010 | Black ............ A61G 5/10 340/540 |
| 2012/0157253 A1 | 6/2012 | Hoff |
| 2012/0205171 A1 | 8/2012 | Takishita et al. |
| 2012/0253570 A1 | 10/2012 | Anders et al. |
| 2012/0253610 A1 | 10/2012 | Anders et al. |
| 2012/0285757 A1 | 11/2012 | Atarashi et al. |
| 2012/0292918 A1 | 11/2012 | Bichler et al. |
| 2013/0071212 A1 | 3/2013 | Yunoue et al. |
| 2013/0133966 A1 | 5/2013 | Jiang et al. |
| 2013/0141889 A1 | 6/2013 | Tsuchiya et al. |
| 2013/0244089 A1* | 9/2013 | Shimizu ............ H01M 2/1016 429/176 |

* cited by examiner

LIGHT TOWER HAVING A BATTERY HOUSING

CROSS REFERENCE TO RELATED APPLICATION

This application claims the benefit of U.S. Provisional Application having Ser. No. 61/868,608 filed on Aug. 22, 2013 the entire disclosure and contents of which are hereby incorporated herein by reference.

BACKGROUND

Energy is in constant need for powering equipment of all types and kinds. Recently, there has been a trend to power a plurality of different machines, for example automobiles, motorcycles, and construction equipment with electric. Typically these electrically powered devices will carry a power source in the form of a battery to power them.

However, there are needs for improved battery designs that have a more universal applicability so that the battery is capable of powering devices from light towers to bulldozers.

SUMMARY

There is provided a rechargeable battery power system having a battery with multiple uses. The rechargeable battery power system provides for a clean and quite power source that includes a self contained battery that does not require cooling and that can be used in a plurality of different applications that require electric power.

In particular, there is a battery assembly that comprises a battery housing and a battery, and the battery is disposed in the battery housing. The battery is a multiple use battery because it may be used in a plurality of different applications ranging from a stand-alone power source to a power source for powering equipment, lights and virtually any other machine that has a need for electrical power.

The battery housing has a base wall joined to first and second side walls and the base wall joined to opposed first and second end walls. There is a housing cover that is releasable joined to the first and second opposed side walls and the opposed first and second end walls such that the cover is disposed opposite the base wall.

The first sidewall includes a metal layer and first and second foam layers and a plastic sheet such that the first foam layer abuts against and is joined with the metal layer, and the first foam layer abuts against and is joined with the second foam layer. The second foam layer abuts against and is joined with the plastic sheet.

The second side wall is structurally identical to the first side wall.

The cover has opposed exterior and interior sides and a service disconnect extends from the exterior side. Joined to the interior side of the cover is a rubber sheet, and a foam cover sheet is joined to the rubber sheet such that the rubber sheet is disposed between the interior side of the cover and the foam cover sheet. The first end wall is joined to a first end wall foam sheet and the second end wall is joined to a second end wall foam sheet, and the second end wall has an exterior end wall surface and a current sensor is mounted to the second end wall.

The base wall of the battery housing has a metal base wall sheet having opposed interior and exterior metal base wall surfaces, and joined to the interior metal base wall surface is a base wall foam sheet that is joined to a base wall rubber sheet.

As previously mentioned, disposed internal to the battery housing is the battery. The battery has first and second module banks Each of the first and second module banks is made of from groups of modules, and each module is made of individual cells. In one preferred embodiment each module has eight (8) cells that are electrically connected to one another, and the modules are electrically connected to one another to form the groups of modules. The first and second module banks may be electrically connected to one another such that together they can output power. In addition, a separator support plate separates the first and second module banks from one another. The separator support plate is part of the battery housing. The separator support plate provides for structural integrity and a thermal barrier between the first and second module banks.

In one of the preferred embodiments, the battery assembly is installed in an excavator or other piece of equipment, for example heavy construction equipment, during the manufacturing process of the excavator or other piece of equipment.

In another preferred embodiment there is provided a method for taking a used piece of equipment, for example a used excavator, and removing its engine. Then, the engine compartment is re-configured to house the battery assembly. There is provided a battery management system, a variable frequency driver and a variable frequency brushless electric motor or other suitable motor the shaft of which is connected to a hydraulic pump in order to complete the conversion from gas/diesel power to electric power.

In another preferred embodiment there is a light tower comprising a tower frame and the tower frame may be mounted on wheels. The light tower is telescopic and has a base portion that houses an extendable portion wherein the extendable portion can be raised and lowered. A battery assembly is provided and is supported by and connected to the tower frame. Lead lines extend from the battery assembly to a tower inverter that converts DC power from the battery to AC power, and inverter lead lines that extend from the tower inverter to the light array and the light array includes the light bulbs. The light bulbs are light emitting diodes (LED's) in one of the preferred embodiments.

DETAILED DESCRIPTION

At the outset, it is to be understood that like reference numerals are intended to identify the same structural elements, portions or surfaces consistently throughout the several drawing figures, such at elements, portions or surfaces that may be further described or explained by the entire written specification, of which this detailed description is a part. Unless otherwise indicated, the drawings are intended to read (that is, cross-hatching, arrangement of parts, proportion, degree, et cetera) together with the specification, and are considered to be a portion of the entire written description. As used in the description, the terms "horizontal," "vertical," "left, right," "up," "down," as well as adjectival and adverbial derivatives thereof (for example, "horizontally", "rightwardly", "upwardly," et cetera) refer to the orientation of the illustrated structure as the particular drawing figure faces the reader. Similarly, the terms "inwardly" and "outwardly" generally refer the orientation of a surface relative to its axis of elongation, or axis of protestation, as appropriate.

Figure 1:
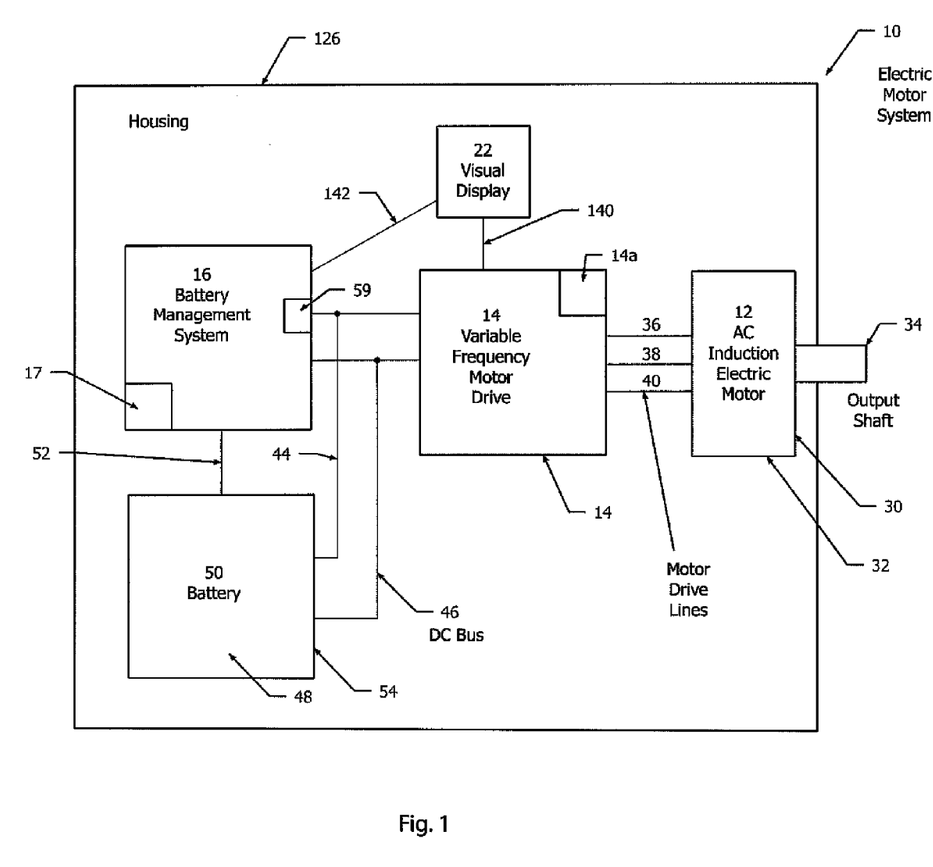
FIG. 1 is a system block diagram of a first embodiment of a rechargeable battery power system.

Turning now to FIG. 1, shown therein is a system block diagram of a rechargeable battery power system 10 having a battery assembly 48. The battery assembly 48 includes a battery 50 having multiple uses and includes a battery housing 54 that houses the battery 50. The rechargeable battery power system 10 has an alternating current (hereinafter referred to as AC) electric motor 12 and may be embodied as other types of motors in other preferred embodiments, a variable frequency motor driver 14, a battery management system 16, and the battery 50. The battery 50 is a lithium-ion battery in one of the preferred embodiments, and in other preferred embodiments may be a lithium nickel manganese cobalt oxide (NMC) battery, a lithium cobalt battery (LCO), a lithium iron phosphate battery (LFP); a lithium manganese oxide battery (LMO); and, a lithium nickel cobalt aluminum battery (NCA). The rechargeable battery power system 10 also includes a visual display 22.

Figure 2:
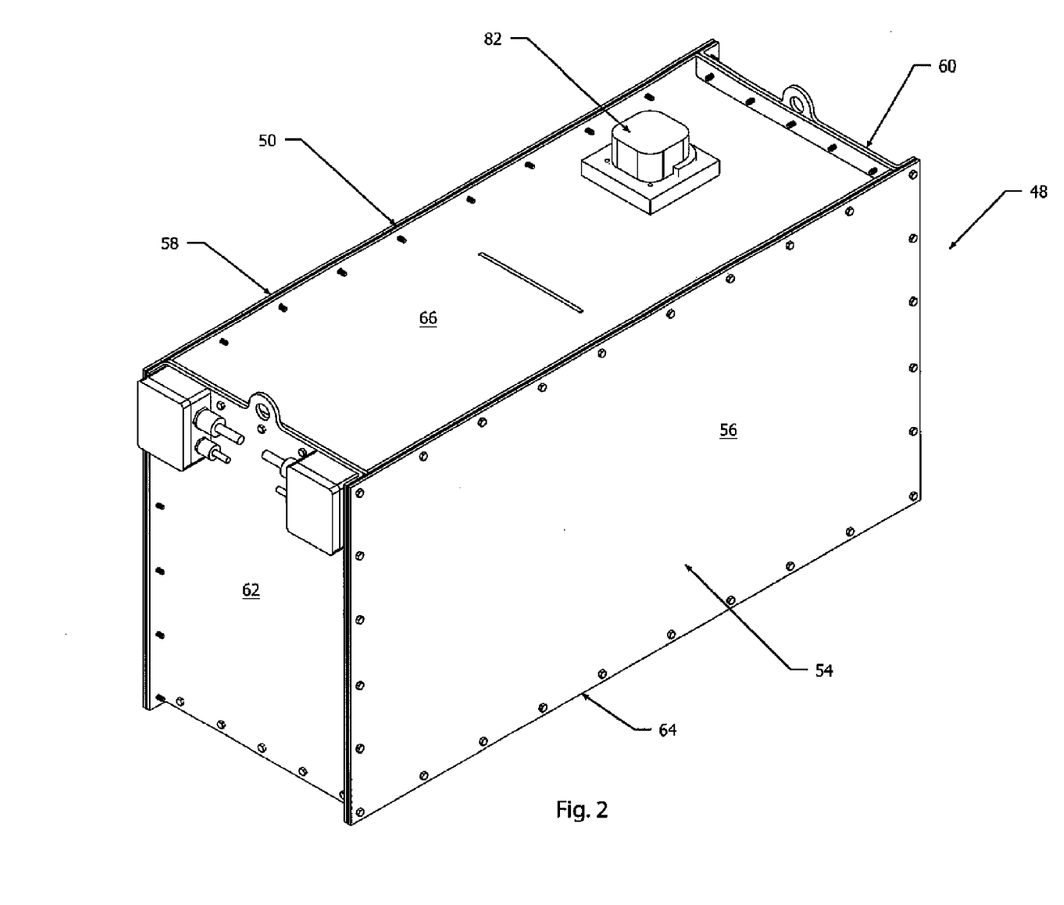
FIG. 2 is a perspective view of an assembled battery assembly for use in the rechargeable battery power system.
Figure 3:
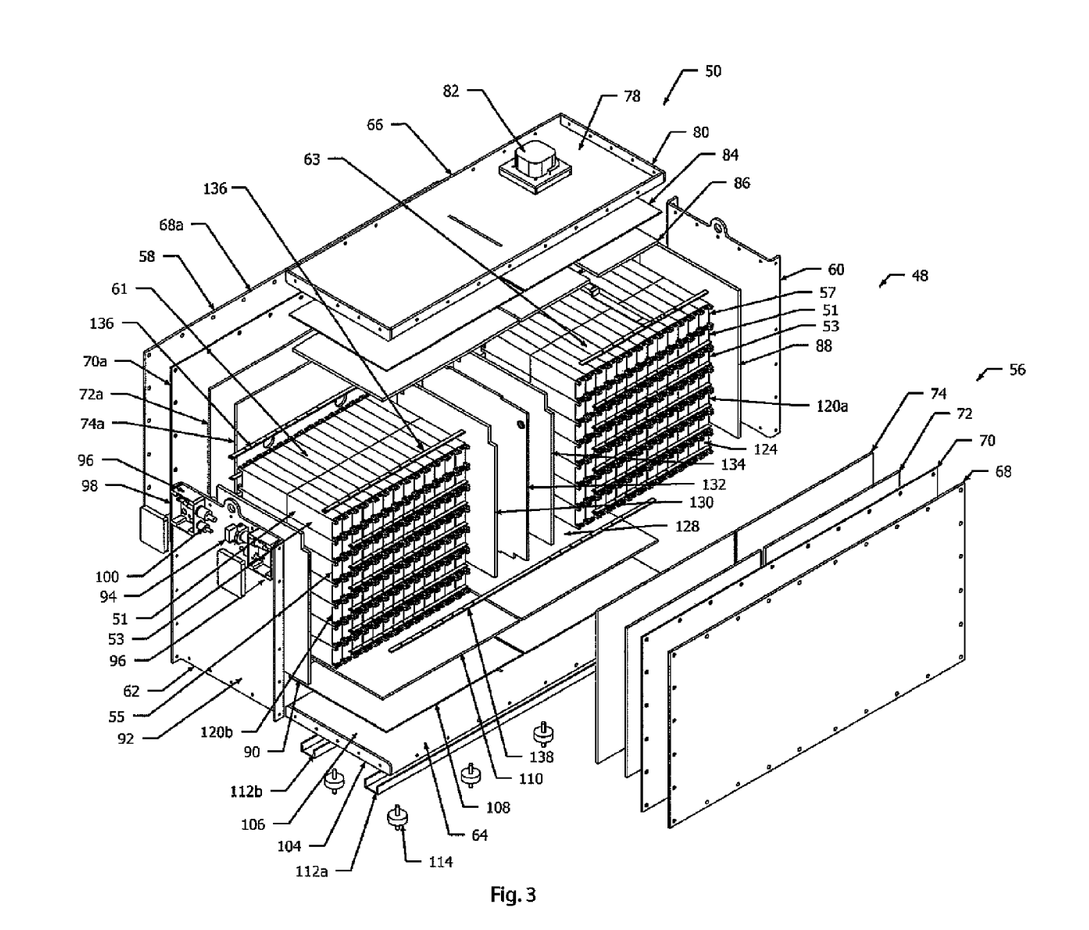
FIG. 3 is an expanded view of the battery assembly shown in FIG. 2.

FIG. 2 is a perspective view of the battery assembly 48, and FIG. 3 shows an exploded view of the battery assembly 48. As shown in FIG. 3 the battery 50 has first and second module banks 61, 63 that are substantially identical. The first module bank 61 is made from a first group of modules 55, and the second module bank 63 is made from a second group of modules 57. In turn, the first and second groups of modules 55, 57 are each made from individual modules commonly designated 53, and each module 53 has individual cells commonly designated 51. The cells 51 are embodied as rechargeable electrochemical cells in one of the preferred embodiments and are for storing electrical energy. In one preferred embodiment each module 53 has eight (8) cells 51 that are electrically connected to one another, and the modules 53 are electrically connected to one another to form the groups of modules 55. In other preferred embodiments each module 53 may have more or less than eight cells 51. The first module bank 61 is electrically connected to a bus bar 136 for allowing current to flow to the terminal boxes 96. And, there are connector bus bars 138 that connect the first and second module banks 61, 63

Figure 4:
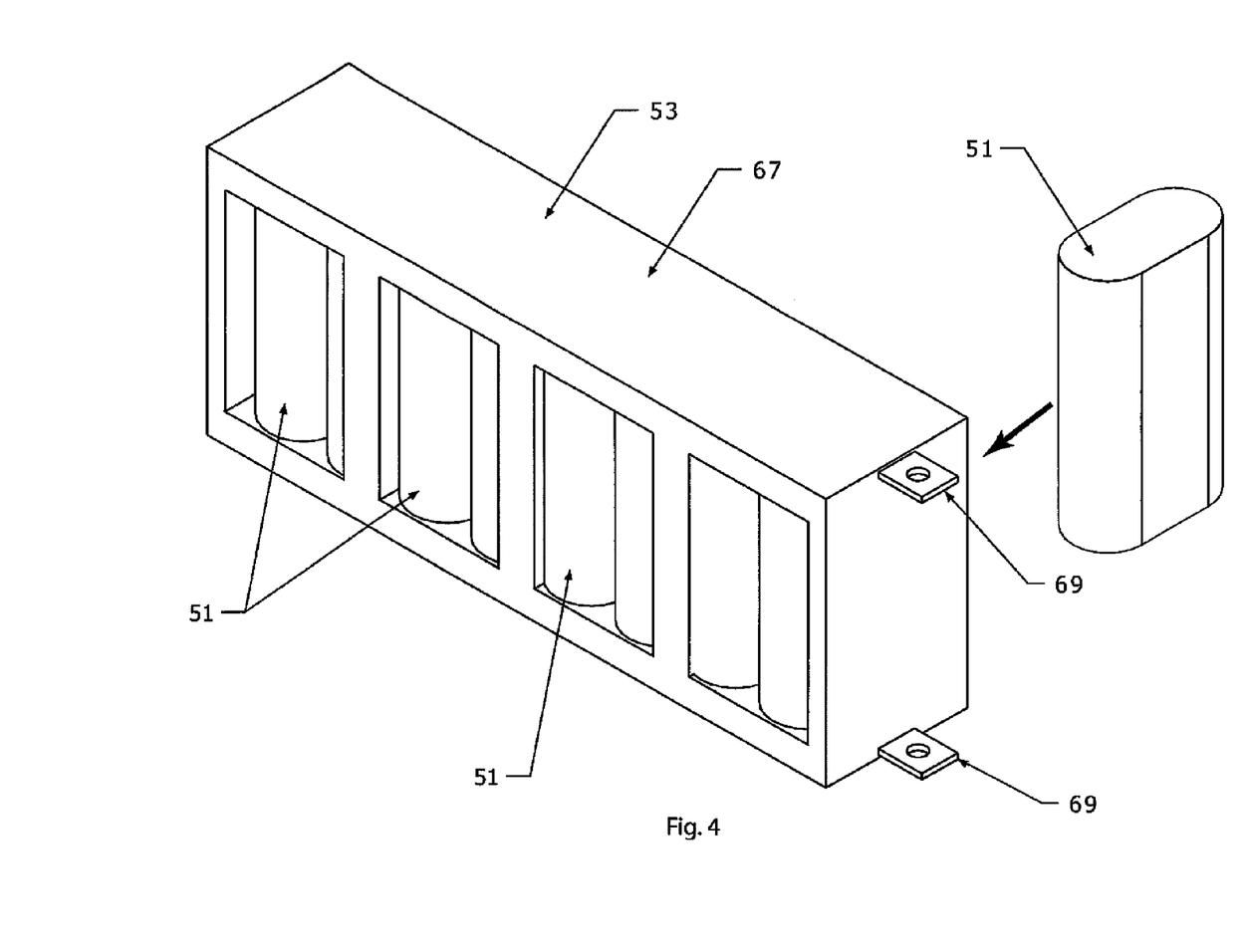
FIG. 4 is a diagrammatic view of a module and cells.

As shown in FIG. 4, the there is a module 53 that has a module case 67 and the cells 51 are stacked together and supported in the module case 67. Module terminals 69 extend from the module case 67 and the module terminals 69 may be electrically connected to other modules 53.

The electric motor 12 shown in FIG. 1 is embodied as a three phase AC induction motor, but in other preferred embodiments other electric motor types may be used. The AC motor has a rotor 30, a stator 32, and an output shaft 34 that delivers output rotary power to a driven object, for example a hydraulic pump. As shown in FIG. 1, the AC induction motor 12 receives first, second and third drive lines 36, 38, 40, one for each phase, and the first, second and third drive lines 36, 38, 40 are driven by the variable frequency motor driver 14. It is pointed out that in other preferred embodiments other electric motors may be used, for example a permanent magnet AC (PMAC) motor may be used. The rotation speed of the AC induction motor 12 ranges from zero to 8,000 (or more) revolutions per minute. In one of the preferred embodiments the AC induction motor 12 is air cooled.

The variable frequency motor driver 14 receives power from first and second direct current (DC) voltage lines 44, 46 from a battery 50, and then it converts electrical power into three phase AC voltage provided on the first, second and third drive lines 36, 38, 40. In addition, the variable frequency driver motor 42 is able to change the frequency and amplitude characteristics of the voltage on each of the first, second and third drive lines 36, 38, 40 so as to be able to control rate of rotation and/or output torque of the AC induction motor 12.

The battery 50 is a lithium-ion type battery. The battery 50 is connected to the battery management system 16 on battery lines 52. The battery 50 stores electrical energy provided by the battery management system 16 and provides electrical energy to the variable frequency motor driver 14. The battery management system 16 has a battery management interface 17 for connection to an external power source, such that when the battery management system 16 is connected to an external power source through the battery management interface 17, power is delivered over the battery lines 52 to charge the battery 50.

As shown in FIGS. 2 and 3 and as previously mentioned, the battery housing 54 of the battery assembly 48 includes opposed first and second side walls 56, 58 and opposed first and second end walls 60, 62 and a base wall 64. The first and second opposed side walls 56, 58 and the opposed first and second end walls 60, 62 extend from and are joined to the base wall 64. The battery housing 54 also has a housing cover 66 that is joined to the first and second opposed side walls 56, 58 and the opposed first and second end walls 60, 62 such that it is opposite the base wall 64. The cover 66, the first and second opposed side walls 56, 58, the opposed first and second end walls 60, 62 and base wall 64 may be connected by any suitable method, for example with nuts and bolts, screws, welds, and the like.

As shown in FIG. 3, the first sidewall 56 is layered and includes a metal layer 68 and first and second foam layers 70, 72, and a plastic sheet 74. The plastic sheet 74 in other preferred embodiments is a polycarbonate resin sheet, or a thermoplastic sheet. Polycarbonate resin sheets can be made of Lexan. Lexan is a registered trademark of Sabic Innovative Plastics IP B.V. having a business address of Plasticslaan 1, 4612 PX, Bergen OP Zoom, Netherlands and is commercially available The first foam layer 70 abuts against and is joined with the metal layer 68, and the first foam layer 70 abuts against and is joined with the second foam layer 72. The second foam layer 72 also abuts against and is joined with the plastic sheet 74.

The second side wall 58 is structurally identical to the first side wall 56 and includes a metal layer 68a, first and second foam layers 70a, 72a, and a plastic sheet 74a. The first foam layer 70a abuts against and is joined with the metal layer 68a, and the first foam layer 70a abuts against and is joined with the second foam layer 72a, and the second foam layer 72a abuts against and is joined with the plastic sheet 74a. The metal layer 68, the first foam layer 68, the second foam layer 72 and the plastic sheet 74 are joined with an adhesive.

The cover 66 of the battery housing 54 has opposed exterior and interior sides 78, 80 and a service disconnect 82 is joined to and extends from the exterior side 78. The service disconnect incapacitates the battery 50, preventing the possibility of electric shock to a service technician, or damage to the battery during service or repair. Joined to the interior side 80 is a rubber sheet 84 a foam cover sheet 86 is joined to the rubber sheet 84, such that the rubber sheet 84 is disposed between the interior side 80 and the foam cover sheet 86.

The first end wall 60 is joined to a first end wall foam sheet 88, and the second end wall 62 is joined to a second end wall foam sheet 90. The second end wall 62 has an exterior end wall surface 92 and a current sensor 94 is mounted to the second end wall 62 and abuts the exterior end wall surface 92. In addition, terminal boxes 96 are mounted to the second end wall 62 and abut the exterior end wall surface 92. Terminals 98 and a monitor wiring inlet 100 are mounted to the second end wall 62.

The base wall 64 has a metal base wall sheet 102 having opposed interior and exterior metal base wall surfaces 104, 106. Joined to the interior metal base wall surface 104 is a first base wall rubber sheet 108 that is joined to a second base wall rubber sheet 110.

The battery housing 54 of the battery assembly 48 is mounted on a pair of brace members 112a, 112b that have channel-shaped cross sections. In particular, isolation mounts 114 are threaded to the base wall 64 and the brace channel 112a, 112b such that they isolate the battery housing 54 from a surface that supports the brace channels 112a, 112b.

As previously described, the battery 50 has first and second module banks 61, 63 that are substantially identical and that are disposed internal to the battery housing 54. As shown in FIG. 3 a gap 128 extends from the first module bank 61 to the second module bank 63 and disposed in the gap 128 are first and second separator foam sheets 130, 134. Disposed between the first and second separator foam sheets 130, 134 is a separator support plate 132. The separator support plate 132 is made of metal in one of the preferred embodiments so that the battery housing 54 is strong and durable and capable of withstanding various external loads imposed thereon, and the separator support plate serves as a thermal barrier between first and second module banks 61.63.

It is pointed out that the battery 50 does not need an active cooling system to be cooled because of its configuration and will not overheat when used in connection with the applications and embodiments to be described presently. Thus, the battery 50 can be completely sealed from the environment, protecting against intrusion of water or other contaminants common in harsh environments. In addition, the battery 50 has a high energy density and thus can provide a long run time on as single charge and can be used in construction applications.

As shown in FIG. 1, the visual display 22 is connected to the variable frequency motor driver 14 by a first visual display line 140, and the battery management system 16 is connected to the visual display 22 by a second visual display line 142. The visual display 22 receives inputs (battery data 59 and variable frequency motor driver data 14a) by way of the first and second visual display lines 140, 142, and displays the battery data 51 and variable frequency motor driver data 14a that pertains to the operation of the variable frequency motor driver 14 and the battery 50.

Use of the rechargeable battery power system 10 having a battery 50 with multiple uses begins with connecting the rechargeable battery power system 10 to the battery 50 by way of the interface 17, the battery management system 16 detects the connection made to the interface 17 and controls the flow of power through the interface 17 to charge the battery 50. Power continues to flow from the external electrical power source through the interface 17 and to the battery 50 until the battery 50 is fully charged. It is pointed out that the interface 17 may be disconnected from the external electrical power source prior completely charging the battery 50. The external electrical power is most commonly the power grid, but maybe be the source may be a generator, for example a portable diesel powered generator.

The AC induction motor 12 is typically mounted on a surface or on a vehicle frame. The output shaft 34 is coupled to a drive object or driven shaft prior to actuating the AC induction motor 12. When the AC induction motor 12 is actuated the variable frequency motor driver 14 causes electrical power to flow from the battery 50 to the AC induction motor 12. In particular, the variable frequency motor driver 14 causes a sinusoidal voltage to flow in each of the first, second and third drive lines 36, 38, 40. The variable frequency motor driver 14 controls the frequency and amplitude of the voltage in the first, second and third drive lines 36, 38, 40 in order to control the speed and power output of the AC induction motor 12. The visual display 22 provides an active display of operating information from the variable frequency motor driver 14. Then, when the charge in the battery 50 is depleted, the interface 17 is reconnected to the electrical power source in order to recharge the battery 50 as described.

It is pointed out that the battery 50 is adaptable for use in virtually any application requiring electrical power including vehicles, machines, homes, businesses and the like. In other words, the applications wherein the battery 50 may by employed and used is without limit.

Figure 5:
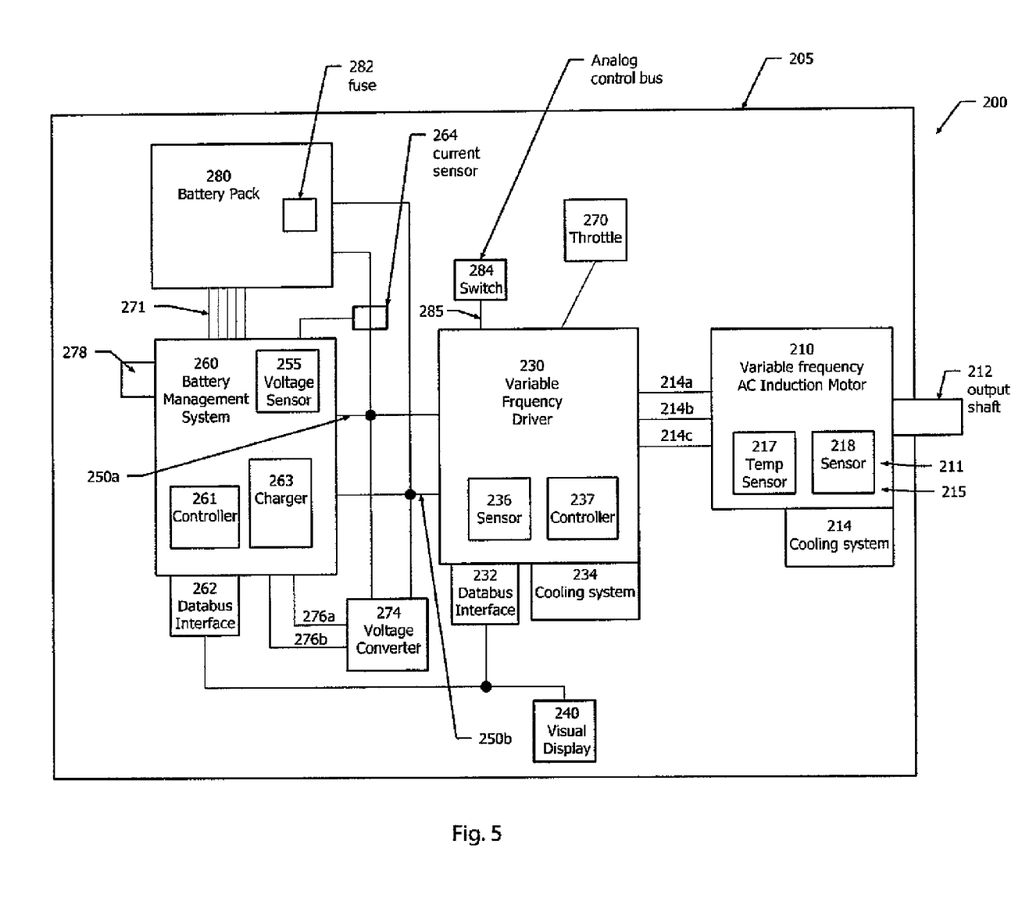
FIG. 5 is a system block diagram of another embodiment of a rechargeable battery power system for use with a hydraulic excavator.

FIGS. 5-8 show a second embodiment wherein there is a machine rechargeable battery power system 200 provided for use in a piece of equipment 298 that requires a source of power, for example an excavator 300. Turning now to FIG. 5, the machine rechargeable battery power system 200 has the main components that include an a variable frequency AC induction motor 210, a variable frequency motor driver 230, a battery management system 260, and a lithium-ion battery 280 all disposed in a motor system housing 205. In one of the preferred embodiments the battery 280 is structurally identical to the previously described battery assembly 48 having a battery 50 and a battery housing 54, and in other preferred embodiments the battery 280 can be made more powerful by the addition of identical third and fourth banks of module banks. The machine rechargeable battery power system 200 further includes a visual display 240, a throttle 270, and a voltage converter 274.

The variable frequency AC induction motor 210 is a three phase AC induction motor, and in other preferred embodiments an electric motor of other types may be used. The variable frequency AC induction motor 210 has a rotor 211, a stator 215, and an output shaft 212 that delivers output rotary power to a driven object. Variable frequency induction AC induction motors are commercially available and are well known to those having ordinary skill in the art and are therefore not described herein in greater detail. The variable frequency AC induction motor 210 receives three drivelines 214a, 214b and 214c, one for each phase. The variable frequency motor driver 230 drives the drivelines 214a, 214b and 214c. The variable frequency AC induction motor 210 also contains a temperature sensor 217 that measures the temperature of the variable frequency AC induction motor 210, and a sensor 218 that measures the speed of the rotor 211. The variable frequency AC induction motor 210 also includes a cooling system 214 that is an air cooled system in one embodiment and is a fluid cooling system in other preferred embodiments. Cooling a motor with air or fluid is well known to those having ordinary skill in the art and is therefore not described in greater detail herein.

The variable frequency motor driver 230 received power from the first and second DC voltage lines 250a, 250b and converts electrical power into three phase AC voltage provided on the drive lines 214a, 214b and 214c. Variable frequency motor drivers are commercially available, and are well known to those having ordinary skill in the art and therefore they are not described in greater detail herein. The variable frequency motor driver 230 is able to change the frequency and amplitude characteristics of the voltage on each of the drive lines 214a, 214b and 214c so as to control rotation rate and/or output torque of the variable frequency AC induction motor 210. A databus interface 232 is a CAN Bus interface, however, other bus interfaces may be used as well. The databus interface 232 receives and transmits information, commands, status, faults, and other similar information utilized by the machine electric motor system 200. The variable frequency motor driver 230 also has analog controls from the battery management system 260. The power received by the variable frequency motor driver 230 from DC voltage bus lines 250a, 250b is provided by the battery 280. The variable frequency motor driver 230 contains the databus interface 232. The databus interface 232 allows the variable frequency motor driver 230 to transmit and receive operating information, commands, statuses, and faults within and used by the utilized by the machine electric motor system 200. The variable frequency motor driver 230 also has a driver cooling system 234 that is air cooled in a preferred embodiment, and other preferred embodiments the driver cooling system 234 is a liquid cooling system. The variable frequency motor driver 230 also has a driver temperature sensor 236 for measuring the temperature of the variable frequency motor driver 230. The variable frequency motor driver 230 also has a driver controller 237 that in one of the preferred embodiments is a logic based controller such as a recontroller/microprocessor/CPU/FPGA/CPLD, that may be programmed to cause the variable frequency motor driver 230 to properly control the voltage and/or power on the drive lines 214a, 214b and 214c

The throttle 270 is connected to the variable frequency motor driver 230 and provides variable frequency motor driver 230 information pertaining to a user's desired operating parameters. In particular, the throttle may be a variable resistor coupled to a manual controller, providing the variable frequency motor driver 230 with a voltage level that represents the desired speed or torque provided by the electric motor. The throttle may also be a Hall effect sensor, or other device capable of controlling a voltage level to the variable frequency motor driver 230.

The variable frequency motor driver 230 is coupled or otherwise joined to both the battery 280 and the battery management system 260 through first and second voltage lines 250a, 250b. A switch 284 is located on analog communication lines 285 connected to the variable frequency motor driver 230, allowing switch 284 to act as an on/off switch or kill switch, capable of cutting off power to the variable frequency motor driver 230. As shown, the first voltage line 250a has a current sensor 264 arranged adjacent to the battery pack 280 in order to measure the current flowing in and out of the battery 280. A fuse 286 is located within the battery 280 and is capable of stopping electric current flow in the event the current flow is too high.

As described above, the battery 280 may be embodied to be identical to the previously described battery 50 and comprises cells 51 and modules 53 of lithium-ion batteries. The cells may be arranged in a 28 serial by 13 parallel array in one of the preferred embodiments. Other lithium iron type batteries are also suitable for use. The cells 51 in the battery 280 and the battery 50 are commercially available. Additionally, lithium-ion batteries are well known to those having ordinary skill in the art and therefore are not described in greater detail herein. It is pointed out that the battery 280 and battery 50 may have cells from a different battery provider and may have a different cell arrangement in order to provide different voltage, capacity, maximum current, or battery housing envelope characteristics. Battery 280 is connected to the battery management system 260 via battery lines 271. The battery 280 stores electrical energy provided by the battery management system 260 and provides electrical energy to the variable frequency motor driver 230.

The battery management system 260 for use in connection with any embodiment mentioned herein. Battery management systems are commercially available and are well known to those having ordinary skill in the art and are therefore not described in greater detail herein. The battery management system 260 has a battery management interface 278 for connection to an external electrical power source, for example the power grid or a generator. When the battery management system 260 is connected to the external power source through the battery management interface 278, power is delivered over battery lines 271 in order to charge the battery 280. The battery management system 260 also contains management system controller 261 for providing logic control for charging and monitoring the battery 280 and communicating with other system components over a management system data bus interface 262. The data management system 260 also contains a charger 263 that converts voltages and provides current to the battery 280 while recharging. Data management systems are commercially available and are well known to those having ordinary skill in the art and therefore they are not described in greater detail herein. The battery management system 260 controls current provided by the charger 263 and further includes voltage sensors 255, current sensor 264 and thermistors for controlling the charging process of the battery pack 280.

The voltage converter 274 is coupled to the battery management system 260 through first and second converter lines 276a, 276b and is also connected to first and second voltage lines 250a, 250b that are DC. The voltage converter 274 provides efficient voltage conversion from one voltage to another. In particular, the voltage converter 274 is capable of stepping down the voltage of the battery pack 280 to twelve volts (hereinafter referred to as 12V) that is needed by logic management components in the battery management system 260 and other 12V components of the machine electric motor system 200. The voltage converter output may range from 12V to about 13.5V.

Figure 6:
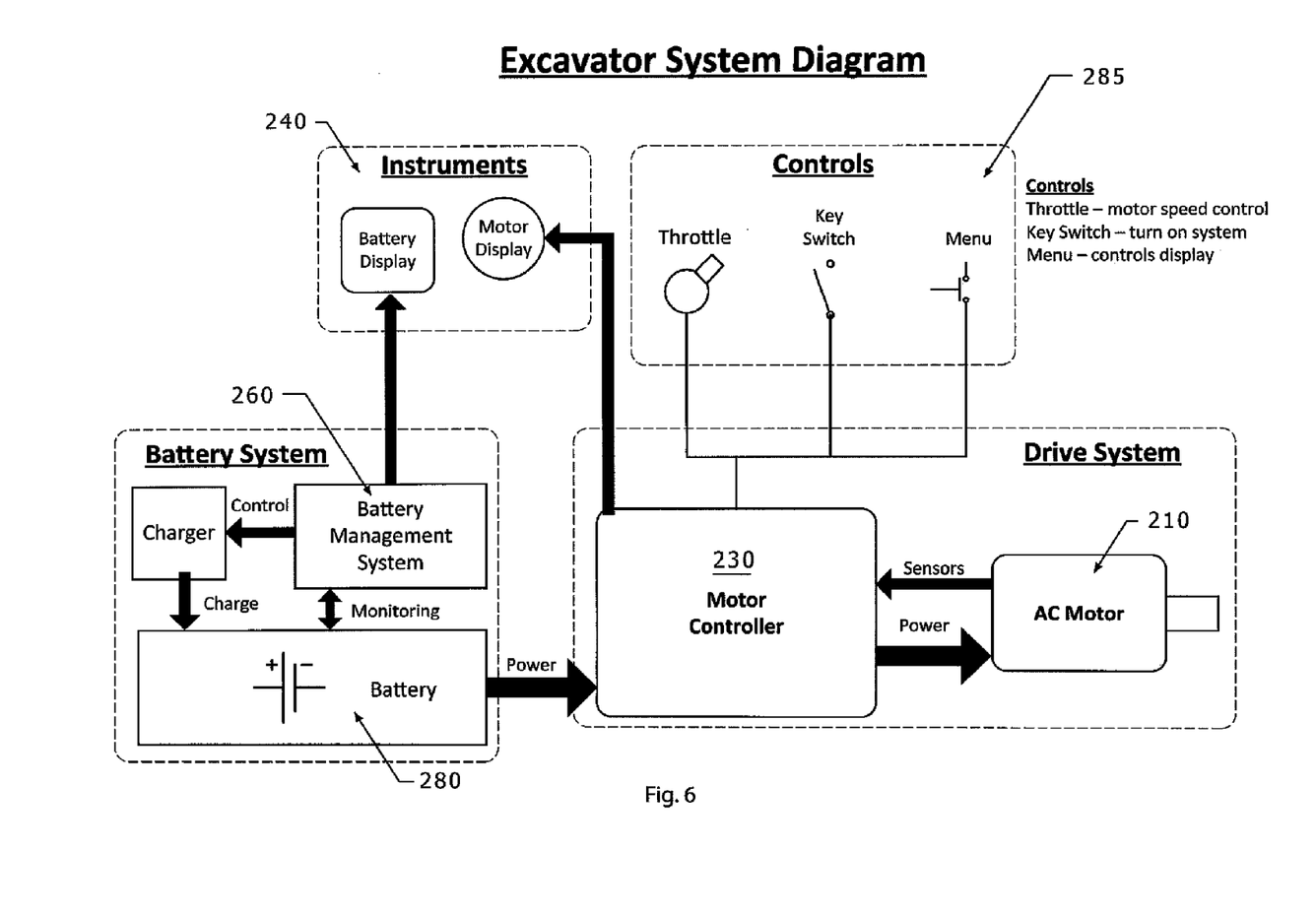
FIG. 6 is a block diagram for a battery system; drive system, and instruments and controls for the rechargeable battery power system when used in the hydraulic excavator.

FIG. 6 is a block diagram for a battery system, drive system, and instruments and controls for the electric motor system.

Figure 7:
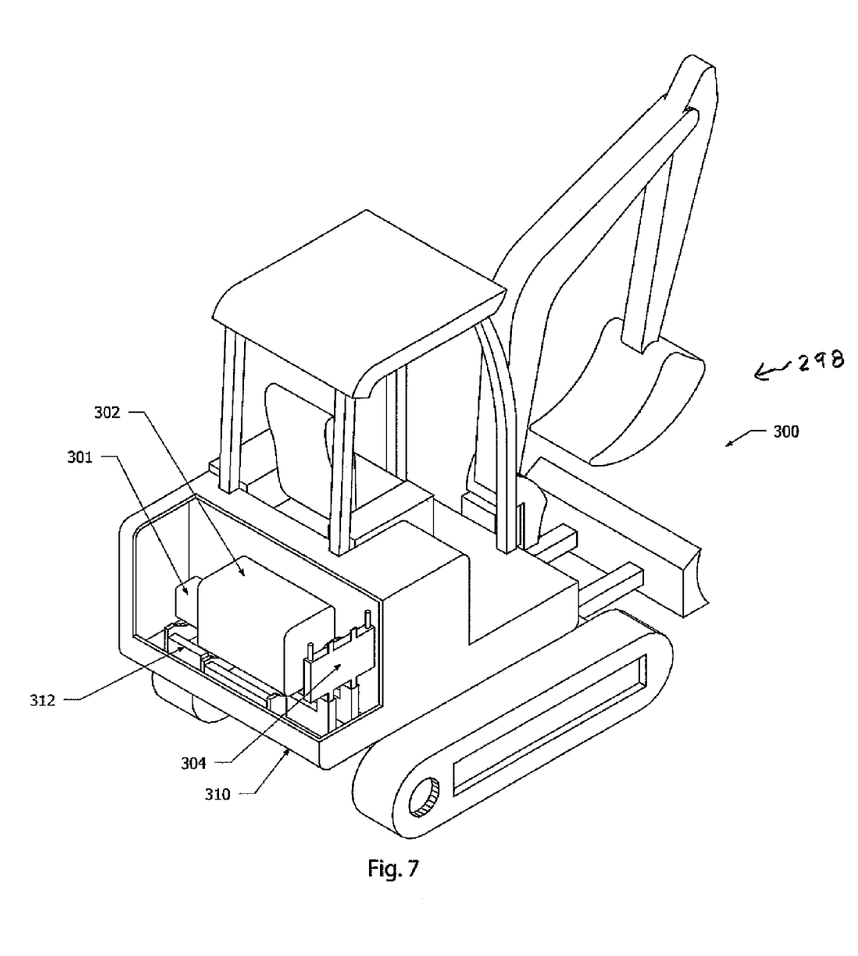
FIG. 7 is a schematic diagram of a hydraulic excavator powered by an internal combustion engine such as a gas or diesel engine.

FIG. 7 shows another preferred embodiment the piece of equipment 298 is embodied as an excavator that has been used and powered by an internal combustion engine 302, for example a gas or diesel engine, and having an engine cooling system 304, and a hydraulic pump 301. There is also a frame 310 that supports the engine 302 on frame support bars 312 that are supported by the frame 310. Mounting engines on frames 310 is well known to those who have ordinary skill in the art and therefore not described in greater detail herein.

Figure 8:
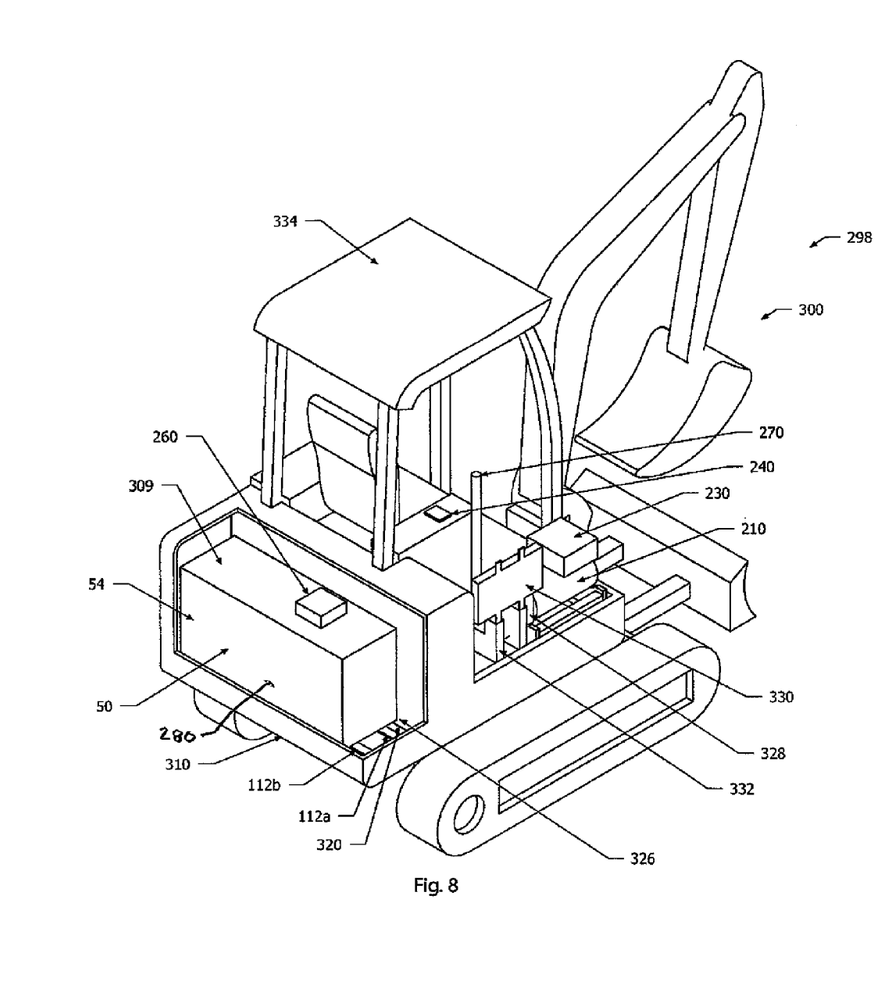
FIG. 8 is a schematic diagram of a hydraulic excavator modified such that it has a rechargeable battery power system.

As shown in FIG. 8, the excavator 300 is modified. First the internal combustion engine 302 and associated engine cooling system 304 are removed, along with the frame support bars 312, and this results in a battery recess 309 being formed in the excavator 300. Then, a battery support plate 320 is welded or otherwise joined to the frame 310. After installation of the battery support plate 320 the previously described battery 50 or battery 280 in is placed on battery support plate 320. In particular, in the previously described a pair of brace members 112a, 112b contact the battery support plate 320 and are secured to the battery support plate 320 with fasteners 326, for example bolts and nuts. In addition, as shown there is the variable frequency motor driver 230 that controls the variable frequency AC induction motor 210, that in, turn rotates and spins a hydraulic pump 328. A pump cooling system 330 cools the hydraulic fluid pumped by the hydraulic pump 328. The variable frequency motor driver 230, hydraulic pump 328 and pump cooling system 330 are mounted to and supported on a new support structure 332 mounted to the frame 310 of the excavator 300 and thus have been relocated. The previously described battery management system 260 is also provided and disposed on the excavator 300. The throttle 270 and visual display 240 are disposed in the cab 334 of the excavator 300.

In another preferred embodiment the excavator 300 is newly manufactured and constructed to have the machine rechargeable battery power system 200 and features described immediately above, in which case there is no need to modify the excavator 300.

Thus, the present machine rechargeable battery power system 200 provides for a method of rebuilding excavators 300 comprising the acts of:

providing an excavator 300 powered by an internal combustion engine 302;

extracting the engine from the excavator 300;

modifying the frame 310 of the excavator 300 such that it is capable of supporting a support plate 320 and fitting a support plate 320 on the frame 310 for supporting the battery 280;

providing a battery 280 and fixedly supporting the battery 280 on the support plate 320;

installing a variable frequency motor driver 230 and the variable frequency AC induction motor 210 such that they are supported on the support structure 332 affixed on the frame 310;

providing the hydraulic pump 328 and a pump cooling system 330 for cooling the hydraulic fluid pumped by the hydraulic pump 328, which are relocated from their placement in the internal combustion engine 302; and, providing the battery management system 260 and disposing the battery management system 260, the throttle 270 and the visual display 240 in the cab 334 of the excavator 300.

Figure 10:
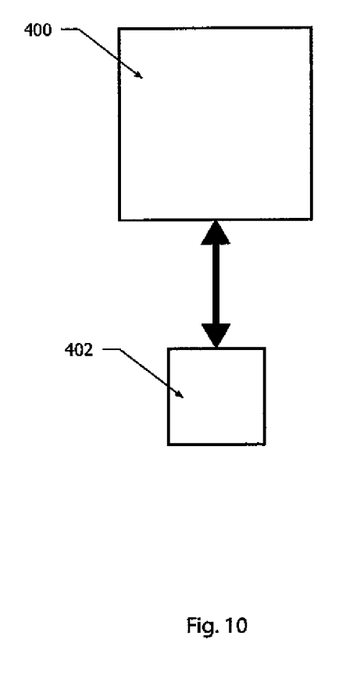
FIG. 10 is a block diagram depicting a service provider entity and customer relationship.

The above-described method of rebuilding a piece of used equipment 298, for example excavators 300 that have been used, provides for a method of generating income. For example and as shown in FIG. 10, there is a service provider entity 400 such as a service store, rebuild company, or a manufacturer that is capable of replacing internal combustion engines 302 with the battery 50, 280 and other power system components, comprise the electric motor system 10. A customer entity or business commonly designated 402 provides a piece of equipment 298 that has been used to the service provider entity 400, or the service provider entity 400 purchases a piece of equipment 298 that has been used, and the service provider entity 400 replaces the internal combustion engine 302 with a the battery 50, 280 and other system components as described above. The service provider entity 400 then charges a fee to the customer entity 402 for labor and cost of the battery 50, 280 and system, or the service provider entity 400 re-sells the piece of equipment 298 to generate income. In other preferred embodiments, the service provider entity 400 makes pieces of equipment 298 that are new with the battery 50, 280 and system components built into the piece of equipment 298 and sells the piece of equipment 280 and to generate a profit.

It is pointed out that the machine rechargeable battery power system 200 and the rechargeable battery power system 10 are not limited to just excavators 300, but they may be used in virtually all construction equipment 298, for example, new and used paving machines, rollers, graders, paving machines, loaders, tractors and trucks and other machines that require a power source. Thus, virtually any piece of equipment 298 having an internal combustion engine 302, for example a gas or diesel engine, and having the engine cooling system 304, and a hydraulic pump 301 may be modified to accept the machine rechargeable battery power system 200 and be equipped with the machine rechargeable battery power system 200. First, the internal combustion engine 302 and associated engine cooling system 304 are removed, and that results in a battery recess 309 being defined in the piece of equipment 298. Then the support plate 320 is welded or otherwise joined to the frame 310 of the piece of equipment. Next, a battery 280 is moved into the battery recess 309 and mounted to the frame 310 of the piece of equipment 298. After installation of the battery support plate 320 the battery 50 or battery 280 is placed on battery support plate 320 that is supported on the pair of brace members 112a, 112b.

Figure 9:
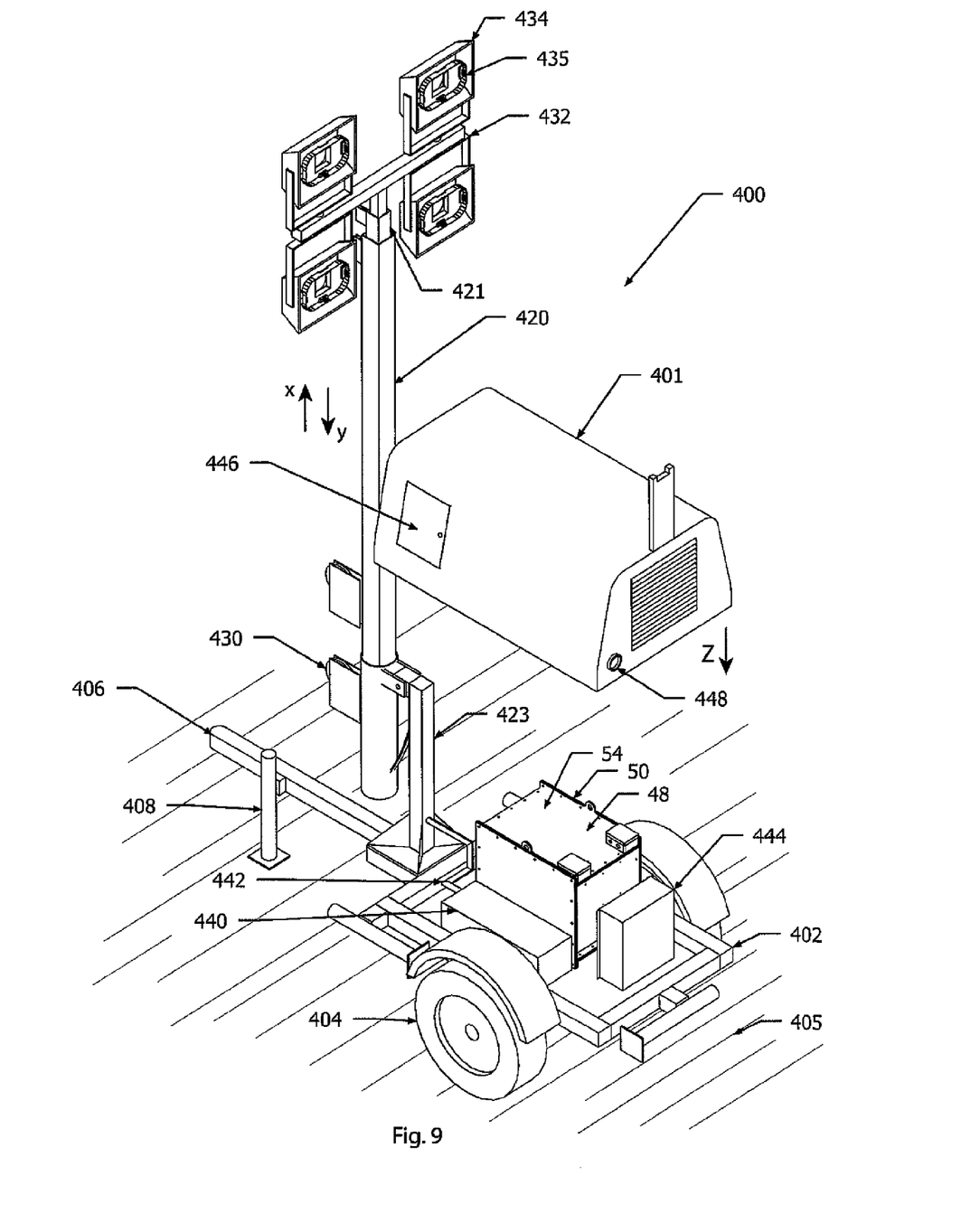
FIG. 9 is another preferred embodiment wherein a light tower is provided and it has a rechargeable battery power system.

FIG. 9 shows another preferred embodiment wherein there is a light tower 400 having a light tower housing 401 wherein a light tower housing 401 is shown prior to installation on a tower frame 402, with arrow Z designating the direction the light tower housing 401 is to be moved. The tower frame 402 is mounted on wheels 404 and a tongue 406 extends from the tower frame 402. A retractable tongue support 408 extends from the tongue 406 and supports the tower frame 402 on the ground 405 when in an extended position as shown. The tongue 406 is for towing the light tower 400 after the retractable tongue support 408 is moved into a retracted position.

There is also a light tower 420 that is supported on the frame 402, and the light tower 420 is telescopic and has a base portion 423 that houses an extendable portion 421 that can be raised and lowed in the directions of arrows X and Y, respectively. The extendable portion 421 can be manually raised and lowered with, for example a hand crank 430. The raising and lowering light towers in well known to those having ordinary skill in the art and therefore is not described in greater detail herein. The extendable portion 421 supports a light array 432 that includes four light fixtures 434 with light bulbs 435. In one of the preferred embodiments the lights bulbs 435 are embodied as LED's and in other embodiments the may be incandescent light bulbs.

Supported on and joined to the tower frame 402 is a battery assembly 48 and in particular the battery housing 54 that holds the battery 50. Lead lines extend from the battery 50 to a tower inverter 440 that converts DC power from the battery 50 to AC power. Inverter lead lines 442 extend from the tower inverter 440 to the light bulbs 435. The housing 54 also supports a control panel 446, and supports a charging port 448 so that the battery 50 may be charged from virtually any power source.

As shown in FIG. 9, the battery 50 for use with the light tower 420 is designed such that it only has a first module bank 61 and the separator support plate 132 is not present. This is due to the fact that the light tower 420 will not have a need for such a large amount of power in some preferred embodiments.

It is pointed out that the use of the machine rechargeable battery power system 200 and the rechargeable battery power system 10 are provide for power with no pollution at a work, job or activity site, a minimal amount of noise at such sites, and no fuels need at the sites. In addition, because there is no noise and there is no messy odiferous fuels used at the sites the rechargeable battery power system 10 and rechargeable battery power system 200 can be used day or night. Thus, workers can work throughout the night without disturbing the neighborhood or city in which they are working. Additionally, the machine rechargeable battery power system 200 and the rechargeable battery power system 10 can be used indoors, whereas toxic emissions from an internal combustion engine 302 would prohibit it from being used indoors. In addition, the above-described battery 50 can be used by itself to supply electric power (NOAH-Something we should mention, Right?)

It will be appreciated by those skilled in the art that while the rechargeable battery power system 10 and the machine rechargeable battery power system 200 and methods for providing rechargeable battery systems have been described in connection with particular embodiments and examples, the rechargeable battery power system 10 and the machine rechargeable battery power system 200 methods associated therewith are not necessarily so limited and that other examples, uses, modifications, and departures from the embodiments, examples, and uses may be made without departing from the rechargeable battery power system 10 and the machine rechargeable battery power system 200, and all these embodiments are intended to be within the scope and spirit of the appended claims.

What is claimed:

1. A battery assembly comprising:
   a battery housing having a base wall joined to first and second side walls and the base wall joined to opposed first and second end walls; and having a housing cover that is joined to the first and second opposed side walls and the opposed first and second end walls such that the cover is disposed opposite the base wall;
   the first sidewall includes a metal layer and first and second foam layers and a plastic such that the first foam layer abuts against and is joined with the metal layer, and the first foam layer abuts against and is joined with the second foam layer, and the second foam layer abuts against and is joined with the plastic sheet;
   wherein the second side wall is structurally identical to the first side wall;
   the cover has opposed exterior and interior sides and a service disconnect is extends from the exterior side;
   joined to the interior side of the cover is a rubber sheet, and a foam cover sheet is joined to the rubber sheet such that the rubber sheet is disposed between the interior side of the cover and the foam cover sheet;
   wherein the first end wall is joined to a first end wall foam sheet and the second end wall is joined to a second end wall foam sheet, and the second end wall has an exterior end wall surface and a current sensor is mounted to the second end wall;
   the base wall having a base wall sheet having opposed interior and exterior base wall surfaces and wherein joined to the interior base wall surface is a first base wall rubber sheet that is joined to a second base wall rubber sheet; and,
   a battery and wherein the battery is disposed in the battery housing.

2. The battery assembly according to claim 1 further wherein the battery has first and second module banks and wherein the first module bank is made from a first group of modules and the second module bank is made from a second group of modules.

3. The battery assembly according to claim 1 further including a pair of brace members and isolation mounts and wherein the pair of brace members is joined to the base wall with the isolation mounts disposed between the base wall and the pair of brace members such that the battery is isolated from vibrations.

4. The battery assembly according to claim 1 wherein a lithium-ion battery is selected from the group consisting of: a lithium nickel manganese cobalt oxide (NMC) battery, a lithium cobalt battery (LCO), a lithium iron phosphate battery (LFP); a lithium manganese oxide battery (LMO); and, a lithium nickel cobalt aluminum (NCA) battery.

5. The battery assembly according to claim 1 wherein the battery has a first module bank having a first group of modules and wherein each module has a module case and cells are disposed in the module case and electrically connected to one another.

6. The battery assembly according to claim 2 wherein each of the first and second groups of modules are each made from individual modules and each module has individual cells that are electrically connected.

7. The battery assembly according to claim 3 wherein a gap is defined from a first module bank to a second module bank and a separator support plate that is part of the battery housing is disposed between the first and second module banks and the separator plate is for providing structural stability.

8. The battery assembly according to claim 7 wherein the battery is installed in a piece of equipment.

9. A light tower comprising:
   a tower frame;
   a light tower supported on the tower frame and wherein the light tower is telescopic and has a base portion that houses an extendable portion wherein the extendable portion can be raised and lowered;
   a light array supported by the light tower;
   a battery housing supported by and connected to the tower frame and a battery is disposed in the battery housing;
   lead lines that extend from the battery to a tower inverter that converts DC power from the battery to AC power;
   inverter lead lines that extend from the tower inverter to the light array and the light array includes the light bulbs;

wherein the battery housing has a base wall joined to first and second side walls and the base wall joined to opposed first and second end walls;

a housing cover that is releasable joined to the first and second opposed side walls and the opposed first and second end walls such that the cover is disposed opposite the base wall;

the first sidewall includes a metal layer and first and second foam layers and a plastic layer such that the first foam layer abuts against and is joined with the metal layer, and the first foam layer abuts against and is joined with the second foam layer, and the second foam layer abuts against and is joined with the plastic sheet;

wherein the second side wall is structurally identical to the first side wall;

the cover has opposed exterior and interior sides and a service disconnect is extends from the exterior side;

joined to the interior side of the cover is a rubber sheet, and a foam cover sheet is joined to the rubber sheet such that the rubber sheet is disposed between the interior side of the cover and the foam cover sheet;

wherein the first end wall is joined to a first end wall foam sheet and the second end wall is joined to a second end wall foam sheet, and the second end wall has an exterior end wall surface and a current sensor is mounted to the second end wall; and, the base wall has a metal base wall sheet having opposed interior and exterior metal base wall surfaces and wherein joined to the interior metal base wall surface is a first base wall foam rubber sheet that is joined to a second base wall rubber sheet.

10. The light tower according to claim 9 wherein the tower frame is mounted on wheels.

11. The light tower according to claim 10 wherein the battery further includes a first module bank and wherein the first module bank is made from a first group of modules wherein each module in the first group of modules has individual rechargeable cells that are electrically connected.

* * * * *